US012358845B2

(12) United States Patent
Ramaswamy et al.

(10) Patent No.: US 12,358,845 B2
(45) Date of Patent: Jul. 15, 2025

(54) CONSUMABLE COATINGS AND METHODS OF PROTECTING A HIGH TEMPERATURE COMPONENT FROM DUST DEPOSITS

(71) Applicant: General Electric Company, Schenectady, NY (US)

(72) Inventors: Vidya Ramaswamy, La Canada, CA (US); Krishan Lal Luthra, Schenectady, NY (US); Geoffrey Mark Eadon, Ballston Spa, NY (US); Vijay Kumar Srivastava, Perrysburg, OH (US); Nathaniel Patrick Brown, Cincinnati, OH (US); Don Mark Lipkin, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 1167 days.

(21) Appl. No.: 16/849,192

(22) Filed: Apr. 15, 2020

(65) Prior Publication Data
US 2021/0324201 A1 Oct. 21, 2021

(51) Int. Cl.
| C04B 41/89 | (2006.01) |
| B05D 1/36 | (2006.01) |
| B05D 7/24 | (2006.01) |
| C04B 41/52 | (2006.01) |
| C09D 1/00 | (2006.01) |
| C09D 1/02 | (2006.01) |
| C04B 41/00 | (2006.01) |
| F01D 25/00 | (2006.01) |

(52) U.S. Cl.
CPC ............ *C04B 41/89* (2013.01); *B05D 1/36* (2013.01); *B05D 7/24* (2013.01); *C04B 41/52* (2013.01); *C09D 1/00* (2013.01); *C09D 1/02* (2013.01); *C04B 41/009* (2013.01); *F01D 25/005* (2013.01); *F05D 2230/90* (2013.01); *F05D 2300/30* (2013.01); *Y10T 428/264* (2015.01); *Y10T 428/31504* (2015.04)

(58) Field of Classification Search
None
See application file for complete search history.

(56) References Cited

U.S. PATENT DOCUMENTS

| 3,574,113 | A | 4/1971 | Shannon |
| 5,660,885 | A | 8/1997 | Hasz et al. |
| 5,773,141 | A | 6/1998 | Hasz et al. |
| 9,540,497 | B2 | 1/2017 | Lipkin et al. |
| 9,714,578 | B2 | 7/2017 | Kirby |
| 9,890,089 | B2 | 2/2018 | Kirby et al. |
| 10,508,059 | B2 | 12/2019 | Kirby |
| 11,078,798 | B2 | 8/2021 | Kirby |
| 2005/0112381 | A1 | 5/2005 | Raybould et al. |
| 2006/0115659 | A1 | 7/2006 | Hazel et al. |
| 2006/0210800 | A1* | 9/2006 | Spitsberg ............... C04B 41/87 428/408 |
| 2006/0211241 | A1* | 9/2006 | Govern .................. F01D 5/288 438/653 |
| 2006/0280952 | A1* | 12/2006 | Hazel ................... C23C 28/3455 427/372.2 |
| 2006/0280963 | A1 | 12/2006 | Hazel et al. |
| 2009/0169914 | A1 | 7/2009 | Fu et al. |
| 2009/0186237 | A1* | 7/2009 | Lee ....................... C23C 28/042 428/678 |
| 2009/0274850 | A1* | 11/2009 | Bhatia .................... C23C 26/00 427/540 |
| 2010/0129636 | A1 | 5/2010 | Cybulsky et al. |
| 2010/0154422 | A1 | 6/2010 | Kirby et al. |
| 2010/0158680 | A1 | 6/2010 | Kirby et al. |
| 2010/0159151 | A1 | 6/2010 | Kirby et al. |
| 2013/0189531 | A1* | 7/2013 | Lee ......................... C09D 5/18 428/448 |
| 2014/0065438 | A1 | 3/2014 | Lee |
| 2014/0261080 | A1* | 9/2014 | Lee ........................ C23C 14/30 427/596 |
| 2015/0167141 | A1 | 6/2015 | Rosenzweig et al. |
| 2015/0174837 | A1 | 6/2015 | Kolvick et al. |
| 2015/0175486 | A1 | 6/2015 | Roberts et al. |
| 2018/0003060 | A1 | 1/2018 | Lipkin et al. |
| 2018/0100396 | A1 | 4/2018 | Lipkin et al. |
| 2018/0154392 | A1* | 6/2018 | Keshavan ................ C23C 4/11 |
| 2018/0154490 | A1 | 6/2018 | Lipkin et al. |
| 2018/0282851 | A1 | 10/2018 | Ndamka et al. |
| 2019/0063223 | A1 | 2/2019 | Lipkin et al. |
| 2019/0093497 | A1 | 3/2019 | Ndamka et al. |

FOREIGN PATENT DOCUMENTS

| CA | 3023689 A1 | 5/2019 |
| WO | WO2018/222174 A1 | 12/2018 |

OTHER PUBLICATIONS

U.S. Appl. No. 16/654,820, filed Oct. 16, 2019.
Ahlborg, et al., Calcium-Magnesium-Aluminosilicate (CMAS) Reactions and Degradation Mechanisms of Advanced Environmental Barrier Coatings, 40$^{th}$ International Conference on Metallurgical Coatings and Thin Films (ICMCTF 2013), NASA/TM-2013-218091, Apr. 29-May 3, 2013, 24 Pages.
Arnaud et al., Effect of Changing the Rare Earth Cation Type on the Structure and Crystallization Behavior of an Aluminoborosilicate Glass, Research Gate, Physics and Chemistry of Glasses, vol. 49, Issue 4, 2008, pp. 192-197. https://www.researchgate.net/publication/233485225_Effect_of_Changing_the_Rare_Earth_Cation_Type_on_the_Structure_and_Crystallisation_Behaviour_of_an_Aluminoborosilicate_Glass.

(Continued)

*Primary Examiner* — Sheeba Ahmed
(74) *Attorney, Agent, or Firm* — Dority & Manning, P.A.

(57) ABSTRACT

A coated component may have a consumable coating that protects the component from dust. A coated component may include a silicon containing substrate defining a substrate surface, a barrier coating on the substrate surface, with the barrier coating defining a barrier surface, and a consumable coating on the barrier surface. The consumable coating may include a ceramic oxide that includes a silicate. A component, such as a component of a turbomachine, may be protected from dust by applying a consumable coating on the component.

17 Claims, 6 Drawing Sheets

(56) References Cited

OTHER PUBLICATIONS

Levi, CMAS Degradation of Environmental Barrier Coatings: Mechanisms and Mitigation, Final Report on ONR Grant No. N00014-06-1-0322, Materials Department, University of California, Sep. 30, 2013, 18 Pages.
Morales, et al., Reacting CMAS with Yttrium Disilicate Environmental Barrier Coating, Chemical Engineering UC Santa Barbara, 2016, 40 Pages. https://eureka-csep.ensi.uesb.edu/files/scholars/files/melissa_morales.pdf.
Zhu, et al., Thermodynamics of Reactions Among $Al_2O_3$, CaO, $SiO_2$ and $FE_2O_3$ During Roasting Processes, 2011, 16 Pages. https://www.intechopen.com/books/thermodynamics-interaction-studies-solids-liquids-and-gases/thermodynamics-of-reactions-among-al2o3-cao-sio2-and-fe2o3-during-roasting-processes.
Richards et al. "Plasma spray deposition of tri-layer environmental barrier coatings", Journal of The European Ceramic Society, vol. 34, No. 12, May 14, 2014, pp. 3069-3083.

* cited by examiner

CONSUMABLE COATINGS AND METHODS OF PROTECTING A HIGH TEMPERATURE COMPONENT FROM DUST DEPOSITS

FIELD OF TECHNOLOGY

Embodiments of the present disclosure generally relate to consumable coatings for protecting barrier coatings on components used in high-temperature systems such as turbomachines, as well as methods of formulating and applying such consumable coatings to protect such components from dust deposits.

BACKGROUND

Higher operating temperatures for turbomachines are continuously being sought in order to improve their efficiency. However, as operating temperatures increase, the high temperature durability of the components of the engine must correspondingly increase. Significant advances in high temperature capabilities have been achieved through the formulation of iron, nickel, and cobalt-based superalloys. Still, with many hot gas path components constructed from superalloys, a thermal barrier coating (TBC) may be used to insulate the components and can sustain an appreciable temperature difference between the load-bearing alloys and the coating surface, thus limiting the thermal exposure of the structural component.

While superalloys have found wide use for components throughout turbomachines, and especially in the higher temperature sections, alternative lighter-weight substrate materials have been proposed, such as ceramic matrix composite (CMC) materials. CMC and monolithic ceramic components can be coated with an environmental barrier coating (EBC) to protect them from the harsh environment of high temperature engine sections, for example, by providing a dense, hermetic seal against the corrosive gases in the hot combustion environment.

When silicon carbide and silicon nitride ceramics undergo oxidation in dry, high temperature environments, a protective silicon oxide scale forms on the surface of the material. In moist, high temperature environments containing water vapor, such as a turbomachine, both oxidation and recession occur due to conversion of the silicon oxide scale to gaseous silicon hydroxide, which results in dimensional loss of the material. For component applications of silicon-based substrates in turbomachines, such material loss can open clearances, reduce wall thickness and result inefficiency losses.

An EBC may be applied onto the surface of the ceramics to help protect the underlying component from high temperatures and water vapor. Materials commonly used for EBCs include rare earth silicates and barium strontium aluminosilicate (BSAS). EBCs are relatively stable in steam compared to the CMC and can prevent penetration of steam to the CMC if present as a dense coating layer.

However, known EBC materials have varying resistance to environmental contaminants, particularly those containing oxides of calcium, magnesium, aluminum, silicon, and mixtures thereof. Dirt, ash, and dust ingested by turbomachines, for instance, are often made up of such compounds, which often combine to form contaminant compositions comprising mixed calcium-magnesium-aluminum-silicon-oxide systems (Ca—Mg—Al—Si—O), referred to herein as "CMAS." At the operating temperatures of a turbomachine, ingested environmental contaminants can be deposited on and adhere to the hot EBC surface, and the adhered contaminant deposits can at least partially melt, forming molten dust at the operating temperatures of the turbine. The deposits, including molten dust such as CMAS, can interact with the barrier coating or can fill its porous structure by infiltrating the pores, channels, cracks, or other cavities in the coating. Upon cooling, the infiltrated deposit solidifies and may cause delamination and/or spalling of the coating. Similarly, non-molten contaminant deposits may infiltrate such pores, channels, cracks, or other cavities in the coating and similarly cause delamination and/or spalling of the coating. In this description, any environmental contaminant deposit as noted above, such as accreted solid dust, partially molten dust, fully molten dust, and CMAS, will be referred to as "dust deposits" or sometimes simply "dust."

A need exists, therefore, for coatings that provide improved protection against dust deposit attack, as well as improved protection from subsequent gas erosion, particle erosion, and particle impact over the current state-of-the-art barrier coatings.

BRIEF DESCRIPTION

Aspects and advantages will be set forth in part in the following description, or may be obvious from the description, or may be learned through practicing the presently disclosed subject matter.

In one aspect, the present disclosure embraces coated components, and more particularly, coated components that have a consumable coating. Exemplary coated components may include components of a turbomachine, or other components, that may be exposed to dust deposits. The presently disclosed coated components include a consumable coating that protects the component from dust deposits. An exemplary coated component may include a silicon containing substrate defining a substrate surface, a barrier coating on the substrate surface, with the barrier coating defining a barrier surface, and a consumable coating on the barrier surface. The consumable coating may include a ceramic oxide that includes a silicate.

In another aspect, the present disclosure embraces methods of protecting a component, such as a component of a turbomachine, from dust deposits. An exemplary method may include applying a consumable coating on a component that has a silicon containing substrate defining a substrate surface and a barrier coating on the substrate surface, with the barrier coating defining a barrier surface. The consumable coating may be applied on at least a portion of the barrier surface, and the consumable coating may include a ceramic oxide that includes a silicate. An exemplary method may additionally include using the coated component with dust deposited on the coated component, such as operating the turbomachine with dust deposits on the coated component installed therein and forming a silicate reaction product from some of the dust deposits and some of the consumable coating.

In yet another aspect, the present disclosure embraces turbomachines or other equipment that have one or more coated components installed therein. An exemplary turbomachine may include one or more coated components, with the one or more coated components having a substrate defining a substrate surface and a coating system applied on the substrate surface, the coating system may include: a bond coat on the substrate surface, a thermally grown oxide (TGO) layer on the surface of the bond coat, a barrier coating on the surface of the TGO layer, with the barrier coating defining a barrier surface, and a consumable coating on the barrier surface. The consumable coating may include a ceramic oxide that includes a silicate.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which refers to the appended Figures, in which.

Figure 1:
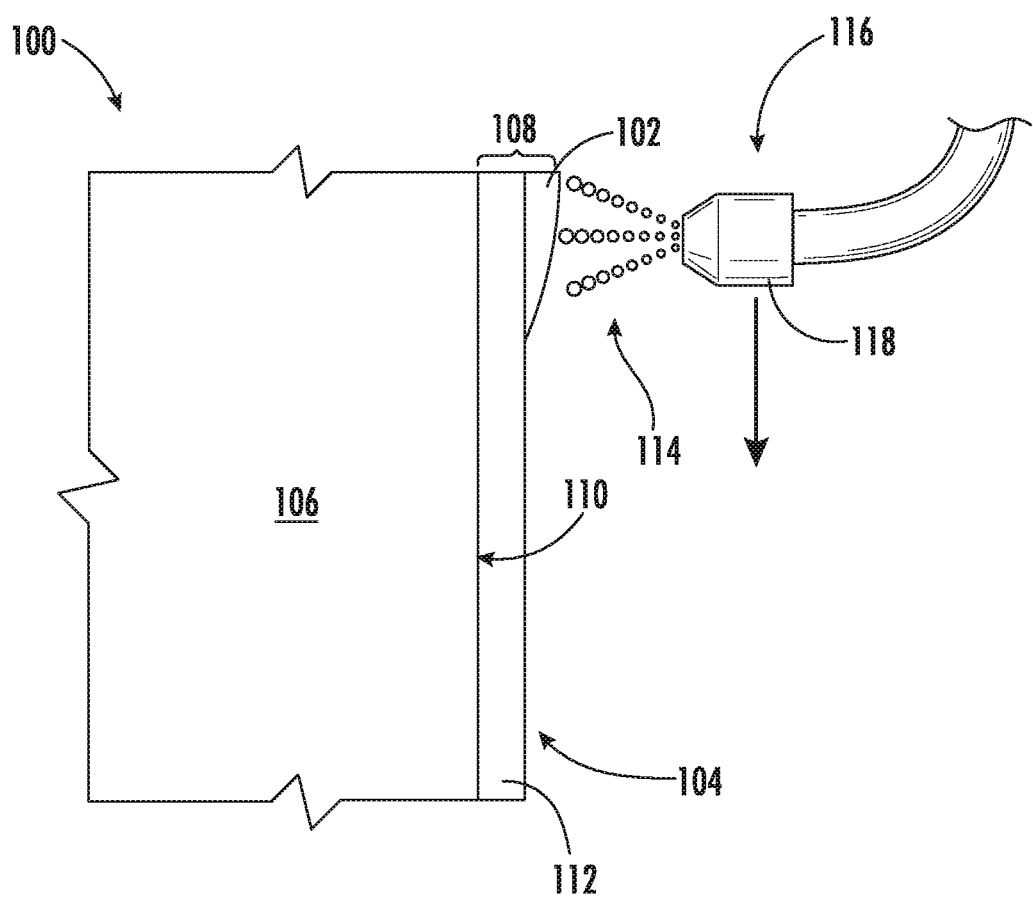
FIG. 1 schematically depicts an exemplary component having a consumable coating applied thereto.

Repeat use of reference characters in the present specification and drawings is intended to represent the same or analogous features or elements of the present disclosure.

DETAILED DESCRIPTION OF PARTICULAR EMBODIMENTS

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope or spirit of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

The present disclosure generally provides consumable coatings that may be applied to components of a turbomachine to protect the components from dust deposits, as well as components that include such a consumable coating, and methods of protecting a component from dust deposits. More particularly, the presently disclosed consumable coatings are intended to protect a barrier coating or underlying substrate of a component from dust deposits.

The consumable coatings presently disclosed may be particularly useful for application to ceramic components, superalloy components, or other components found in high temperature environments (e.g., operating temperatures of about 1,000° C. to about 1800° C.) where molten dust may form, such as in a hot gas path of a turbomachine, and especially in dusty or sandy operating environments such as those in proximity to deserts or other dusty or sandy terrain where elevated levels of dust deposit, such as formation of CMAS, may be prevalent. Exemplary turbomachine components on which a consumable coating may be applied include those located within a compressor section (e.g., compressor vanes, blades, and/or shrouds), a combustion section (e.g., combustion burners, liners, and/or heat shields), or a turbine section (e.g., turbine vanes, blades, and/or shrouds). Components with a consumable coating may be utilized in turbomachinery in general, including in a high bypass turbofan jet engine ("turbofan"), a turbojet, a turboprop, or a turboshaft gas turbine engine, as well as industrial and marine gas turbine engines, and auxiliary power units.

Dust deposits, including molten dust and specifically CMAS can interact strongly with EBCs. In particular, some rare earth silicates (e.g., those including gadolinium, erbium, and yttrium) interact with dust deposits, including molten dust and CMAS, to form highly refractory "calcium-rare earth silicate" phases, such as calcium-rare earth cyclosilicate (e.g., $Ca_3Ln_2Si_6O_{26}$), calcium-rare earth silico-carnotite (e.g., $Ca_3Ln_2Si_3O_{12}$), calcium-rare earth cuspidine (e.g., $Ca_2Ln_2Si_2O_9$), and/or apatite (solid solution based on $Ca_2Ln_8Si_6O_{26}$). The particular calcium-rare earth silicate phases that form, and their respective quantity and relative proportion may depend, for example, on the composition of the dust deposits. Exemplary calcium-rare earth silicate phases may include calcium-gadolinium silicates, calcium-erbium silicates, and calcium-yttrium silicates, among others.

In contrast with other coatings that seek to prevent or limit the formation of reaction products such as apatite by making the coating more resistant to dust deposit attack, the presently disclosed consumable coatings reduce or mitigate the tendency for dust deposits to damage the barrier coating or underlying coating layers or substrate of a component by modifying the chemical composition of the molten or solidified dust deposits. The presence of calcium oxide constituents (e.g., CaO, $CaSO_4$, $CaCO_3$) in the dust deposits tends to affect the degree to which the EBC may be damaged. For example, the extent of calcium-rare earth silicate formation (e.g., apatite formation) may increase directly proportionately to the concentration and/or activity of calcium oxide constituents in the dust deposits. Additionally, or in the alternative, the particular phases of calcium-rare earth silicates that form may depend on the concentration and/or activity of calcium oxide constituents in the dust deposits. The presently disclosed consumable coatings may reduce or mitigate damage from dust deposits to the barrier coating or underlying coating layers or substrate of a component by modifying the chemical composition of the molten or solid dust deposits, for example, by one or both of the following pathways (among others): In some embodiments, the consumable coating may reduce the concentration and/or activity of calcium oxide constituents in the dust deposits. Additionally, or in the alternative, one or more components of the consumable coating may combine and/or react with the calcium oxide constituents in the dust deposits, so as to remove the calcium oxide constituents from being available to interact with the barrier coating. In addition to the foregoing, it will be appreciated that other pathways may exist for the consumable coating to modify the chemical composition of the molten or solid dust deposits. Regardless of the particular pathway(s), the chemical composition of the molten or solidified dust may be modified by providing a consumable coating that includes one or more ceramic oxide constituents that are capable of combining or interacting with the dust deposits at turbomachine operating temperatures. Additionally, in the event of delamination or spalling of the barrier coating, the consumable coating may provide protection to the underlying substrate, for example, by reducing the volatilization rate of silica from substrate materials (e.g., SiC—SiC CMC substrate materials).

As used herein, the term "barrier coating" may refer to and include an EBC and/or a TBC, including one or more layers thereof, as well as one or more other layers such as a bond coat and/or a thermally grown oxide (TGO) layer. Barrier coatings that include an EBC are of particular interest, especially those including one or more rare earth silicates, because dust deposit interaction with rare earth silicates may lead to the formation of calcium-rare earth-silicate (e.g., apatite) layers which are prone to delamination or spalling under typical engine operating conditions.

The underlying substrate may include superalloy materials as well as ceramic materials such as CMC materials and monolithic ceramic materials. The consumable coating may be applied in a variety of ways including in the form of a slurry suspension or as a powder, and the consumable coating may be applied to components prior to installing the components in a turbomachine and/or after the components have been installed. For example, the consumable coating may be applied to various components installed in a turbomachine that has been commissioned for service, without fully disassembling, and in some cases, even without partially disassembling, the turbomachine, including an initial consumable coating as well as reapplications of the consumable coating, for example after a previously applied consumable coating has been exposed to some interval of service. Such coating applications, where the consumable coating is applied to one or more components while the components remain at least partially assembled may sometimes be referred to herein as "in situ," "in the field," or "on-wing" coating applications, and such coating applications may be performed at any desired frequency depending on the operating environment, prevalence of dust and other contaminants, consumption rate of the consumable coating, and the like.

As used herein, the term "CMC" refers to a ceramic substrate material that includes a silicon-containing, or oxide-oxide, matrix and reinforcing material. As used herein, "monolithic ceramic" refers to a ceramic substrate material without fiber reinforcement (e.g., having the matrix material only). Such CMC materials and monolithic ceramics are collectively referred to herein as "ceramic substrates."

As used herein, the term "coating" refers to a material disposed on at least a portion of an underlying surface in a continuous or discontinuous manner. Further, the term "coating" does not necessarily mean a uniform thickness of the disposed material, and the disposed material may have a uniform or a variable thickness. The term "coating" may refer to a single layer of the coating material or may refer to a plurality of layers of the coating material. The coating material may be the same or different in the plurality of layers.

As used herein, the term "silicate" includes any compound, including any ionic or nonionic compound, that has a constituent group with the general formula $[SiO^{(4-2x)-}_{4-x}]_n$, where $0 \leq x \leq 2$ and $n \geq 1$. Such silicates include orthosilicates (x=0), metasilicates (x=1), pyrosilicates (x=0.5, n=2), and silica ($SiO_2$) (x=2). The term "silicate" also includes any salt of such a silicate as well as any ester containing such a silicate.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth. As used herein, "Ln" refers to a rare earth element or a mixture of rare earth elements. More specifically, the rare earth element, Ln, refers to scandium (Sc), yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), or lutetium (Lu), as well as mixtures thereof.

It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Exemplary embodiments of the present disclosure will now be described in further detail with reference to the figures. FIG. 1 shows an exemplary component 100, with a consumable coating 102 being applied on an outer surface 104 of the component 100. The component 100 may include a substrate 106 and a coating system 108 applied to a substrate surface 110 of the substrate 106. The coating system 108 may include a barrier coating 112, which may include one or more coating layers such as an EBC and/or a TBC, and a consumable coating 102 applied on the barrier coating 112. In some embodiments, the consumable coating 102 may be applied in the form of a spray 114 from a coating applicator 116 communicating with a coating formulation source (not shown). The coating formulation sprayed by the coating applicator 116 may be in the form of a slurry suspension or a dry powder, and the coating applicator 116 may include one or more nozzles 118 configured to deliver the spray 114 so as to suitably apply the consumable coating 102 to the outer surface 104 of the component 100. However, the coating applicator 116 as described is provided by way of example only and not to be limiting, and it will be appreciated that any suitable coating applicator 116 or coating technique may be utilized to apply the consumable coating 102 without departing from the spirit and scope of the present disclosure.

The substrate 106 may be formed of a ceramic material such as a monolithic ceramic material or a CMC material. Some examples of CMC materials acceptable for use herein can include, but are not limited to, materials having a matrix and reinforcing fibers comprising non-oxide silicon-based materials such as silicon carbide, silicon nitride, silicon oxycarbides, silicon oxynitrides, and mixtures thereof. Examples include, but are not limited to, CMC materials with silicon carbide matrix and silicon carbide fiber; silicon nitride matrix and silicon carbide fiber; and silicon carbide/silicon nitride matrix mixture and silicon carbide fiber. Furthermore, CMC materials can have a matrix and reinforcing fibers including, for example, oxide ceramics. Specifically, the oxide-oxide CMC materials may include a matrix and reinforcing fibers formed of oxide-based materials such as aluminum oxide or alumina (e.g., $Al_2O_3$), silicon dioxide or silica (e.g., $SiO_2$), aluminosilicates, and mixtures thereof. An exemplary CMC material may include a Si—SiC matrix with SiC fibers. Aluminosilicates can include crystalline materials such as mullite (e.g., $3Al_2O_3 \cdot 2SiO_2$ or $2Al_2O_3 \cdot SiO_2$), as well as glassy aluminosilicates.

Figure 2:
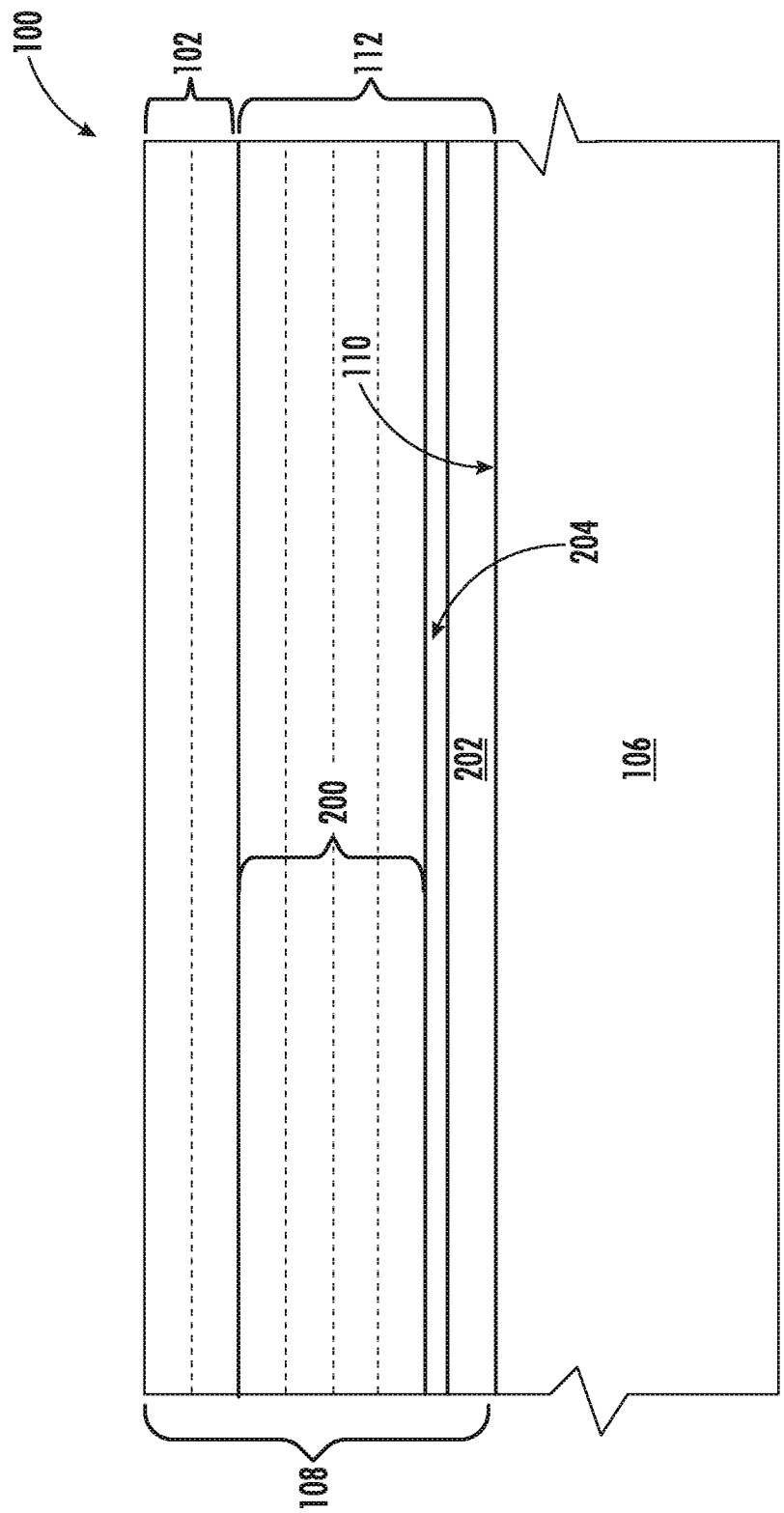
FIG. 2 schematically depicts an exemplary component that has a coating system including a barrier coating and a consumable coating on the barrier coating.

Exemplary coating systems 108 generally include any barrier coating 112, such as an EBC or a TBC, and a consumable coating 102 applied on the barrier coating 112. An exemplary barrier coating 112 will be described in further detail with reference to FIG. 2, and exemplary consumable coatings 102 will be described in further detail with reference to FIGS. 3A-3E. As shown in FIG. 2, a barrier coating 112 may include one or more barrier layers 200, which may include materials selected from any typical EBC materials and/or any typical TBC materials. The barrier coating 112 may optionally include a bond coat 202. The bond coat 202 may be applied directly on the substrate surface 110 without any layer therebetween. However, in other embodiments, one or more layers can be positioned between the bond coat 202, when present, and the substrate surface 110. In other embodiments, the one or more barrier layers 200 may be formed directly on the substrate surface 110.

When present, the bond coat 202 may include elemental silicon or a silicon-based material (e.g., a silicide, etc.), which are useful when applied to a ceramic substrate. Generally, the bond coat 202 is relatively thin, such as having a thickness that is about 25 micrometers (µm) to about 275 µm, such as about 25 µm to about 150 µm (e.g., about 25 µm to about 100 µm).

In some embodiments, the barrier coating 112 may optionally include a thermally grown oxide (TGO) layer 204 on the surface of the bond coat 202. By way of example, a TGO layer 204 may form on the surface of a silicon-based bond coat 202 as a natural product of exposure to oxygen during manufacturing and/or use and can be designed to be thicker by heat treating. The TGO layer 204 may be a silicon oxide, which may sometimes be referred to as "silicon oxide scale" or "silica scale"), and generally has a thickness of up to about 20 µm (e.g., about 0.01 µm to about 6 µm). The TGO layer 204 may not have a uniform thickness, depending on the underlying bond coat 202, processing methods, and exposure conditions.

In various embodiments, one or more barrier layers 200 may be applied on the substrate surface 110, on the surface of the bond coat 202, or on the surface of the TGO layer 204. The composition of the one or more barrier layers 200, such as whether the one or more layers are to include EBC materials and/or TBC materials, may depend on the specific application for the component 100 as well as the composition of the substrate 106. For example, when the substrate 106 includes a ceramic material (e.g., a CMC material), the one or more barrier layers 200 may include one or more EBC materials. Alternatively, or in addition, when the substrate 106 includes a metal alloy such as a superalloy, the one or more barrier layers 200 may include one or more TBC materials. Such EBC materials and TBC materials may be used alone or in combination with one another.

Generally, EBC materials are configured to provide enhanced environmental protection, such as by way of enhanced water vapor barrier priorities, and generally, TBC materials are configured to provide enhanced thermal insulation properties. However, it will be appreciated that EBC materials and TBC materials each may provide both environmental protection as well as thermal insulation in varying degrees depending on the particular composition of the material. For purposes of the present disclosure, in general, the terms EBC and TBC may be used interchangeably to refer generally to a material in a barrier layer 200 of a barrier coating 112 that provides an environmental barrier and/or a thermal barrier to the underlying substrate 106 and/or the underlying layers of the barrier coating 112.

Suitable EBC materials may include, but are not limited to, rare earth silicates (e.g., mono-silicates and di-silicates), aluminosilicates (e.g., mullite, rare earth aluminosilicates, BSAS, etc.), and so forth, as well as combinations of these. In an exemplary embodiment, an EBC material may include one or more rare earth silicates, such as one or more rare earth monosilicates having the formula $Ln_2SiO_5$, and/or one or more rare earth disilicates having the formula $Ln_2Si_2O_7$. By way of example, an EBC material may include ytterbium silicate (e.g., $YbSiO_5$ and/or $Yb_2Si_2O_7$).

Suitable TBC materials may include, but are not limited to, various types of oxides, such as hafnia, zirconia, stabilized hafnia, stabilized zirconia, rare earth hafnates, rare earth zirconates, rare earth gallium oxide, and so forth, as well as combinations of these. Examples of stabilized zirconia may include yttria-stabilized zirconia, ceria-stabilized zirconia, calcia-stabilized zirconia, scandia-stabilized zirconia, magnesia-stabilized zirconia, india-stabilized zirconia, ytterbia-stabilized zirconia, lanthana-stabilized zirconia, or gadolinia-stabilized zirconia, as well as combinations of these. Similar stabilized hafnia compositions are known in the art and suitable for use in embodiments described herein.

The one or more barrier layers 200 may have a combined thickness of from about 25 micrometers (µm) to about 2,000 such as about 25 µm to about 1,500 µm (e.g., about 25 µm to about 1,000 µm).

The barrier coating 112, including the one or more barrier layers 200, and optionally, the bond coat 202, may be applied using any one or more suitable coating techniques, such as plasma spray, thermal spray, chemical vapor deposition, ion plasma deposition, physical vapor deposition, and the like. The barrier coating 112 may also be applied by a slurry or other "wet" process. The coating application method may differ between various layers of the barrier coating 112 and/or as between the optional bond coat 202 and the barrier coating 112.

Figure 3A:
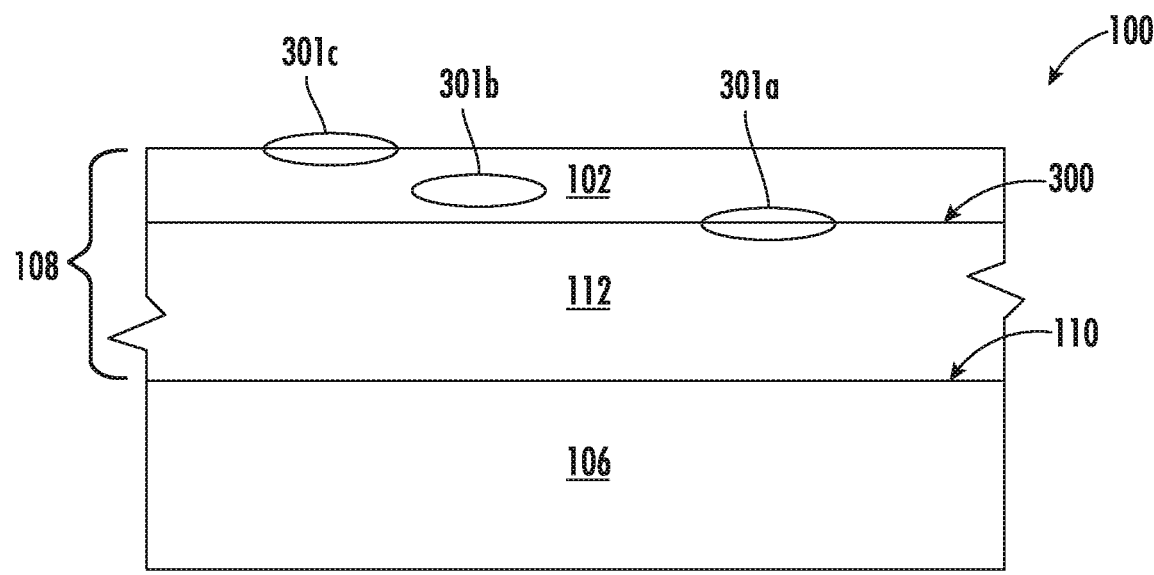
FIGS. 3A-3E schematically depict exemplary embodiments of a consumable coating that may be included in the coating system of FIG. 2.

Referring now to FIGS. 3A-3E, exemplary consumable coatings 102 will be described. As shown in FIG. 3A, a coating system 108 includes a barrier coating 112 (which may include one or more barrier layers 200) applied on a substrate surface 110 of a substrate 106, and one or more layers of a consumable coating 102 applied on a barrier surface 300 of the barrier coating 112. The consumable coating 102 may be applied directly on the barrier surface 300 without any layer therebetween. However, in other embodiments, one or more layers can be positioned between the consumable coating 102 and the barrier surface 300. For example, a component 100 may include one or more pre-existing layers of a consumable coating 102, and one or more new layers of a consumable coating 102 may be applied thereon. One or more new layers of a consumable coating 102 may be applied on a pre-existing consumable coating 102, for example, to replenish the pre-existing consumable coating 102, and the composition of a new consumable coating 102 layer may be the same as or different from the composition of a pre-existing consumable coating 102 layer. The coating system 108 may have dust deposits accumulated at one or more layers of the coating system 108. For example, dust deposits 301a may at least partially penetrate into the barrier coating 112, such as in the case of dust deposits 301a that are present prior to application of a consumable coating 102 or that accumulate after a consumable coating 102 has been sacrificially consumed. Additionally, or in the alternative, dust deposits 301b may at least partially intermix with the consumable coating 102, such as in the course of sacrificially consuming the consumable coating 102. Further additionally, or in the alternative, dust deposits 301c may at least partially accumulate at a surface of the consumable coating 102, such as when dust deposits 301c accumulate after a consumable coating 102 has been applied. Regardless of the location(s) of dust deposits 301, and regardless of when the dust deposits 301 accumulate, the consumable coating 102 may protect the component 100 from such dust deposits 301 as described herein.

The consumable coating 102 may be applied using any one or more suitable coating techniques, such as slurry spray, brushing, rolling or plasma spray, thermal spray, chemical vapor deposition, ion plasma deposition, and/or physical vapor deposition. In the field or in an on-wing coating application, simple ambient-environment coating application techniques may be preferred, such as spraying, brushing, rolling, and so forth. In an exemplary embodiment, the consumable coating 102 may be applied using a coating applicator 116 configured to discharge a spray 114 through one or more nozzles 118 as shown in FIG. 1. Components 100 of a turbomachine may be accessed through one or more access ports in the turbomachine casing, such as borescope ports, igniter ports, fuel nozzle ports, and the like.

As mentioned, the consumable coating may modify the chemical composition of the molten or solid dust deposits through at least two pathways. In some embodiments, according to a first pathway, the consumable coating 102 may include one or more ceramic oxide constituents that may become molten and combine or interact with dust deposits at turbomachine operating temperatures. The one or more ceramic oxide constituents may thereby reduce or mitigate the tendency for dust deposits to damage the barrier coating 112 or underlying coating layers or substrate 106 of a component 100 by modifying the chemical composition of the dust deposits in their molten or solid state. The ceramic oxide constituents used in the consumable coating 102 to dilute the dust deposits may include the same or similar constituents as the contaminant-based dust deposits, except with the absence of calcium oxide constituents. For example, the consumable coating 102 may include one or more silicate constituents (e.g., silica/$SiO_2$), one or more alumina oxide constituents (e.g., alumina/$Al_2O_3$), one or more magnesium oxide constituents (e.g., magnesia/MgO), and/or one or more mullite oxide constituents. A mullite oxide constituent may be referred to herein as "mullite," which may include from about 40 mol % $Al_2O_3$-60 mol % $SiO_2$ to about 60 mol % $Al_2O_3$-40 mol % $SiO_2$. By way of example, mullite may be present in the form of $3Al_2O_3 \cdot 2SiO_2$ and/or $2Al_2O_3 \cdot SiO_2$). By reducing the concentration and/or activity of calcium oxide constituents in the dust deposits, the driving force for the formation of apatite (e.g., $Ca_2Ln_8(SiO_4)_6O_2$) may be reduced, and/or the amount of calcium oxide constituents physically available to interact with the barrier coating 112 may be reduced.

Additionally, or in the alternative, according to a second pathway, the consumable coating 102 may include one or more ceramic oxide constituents capable of interacting with the calcium oxide constituents in the dust deposits, such as in the presence of high temperature, so as to remove the calcium oxide constituents from being available to interact with the barrier coating 112. For example, the consumable coating 102 may include one or more rare earth oxides, such as one or more rare earth silicates, that may interact with the calcium oxide constituents in the dust deposits. In some embodiments, one or more rare earth oxides in the consumable coating 102 may interact with the calcium oxide constituents in the dust deposits to form an apatite phase (e.g., $Ca_2Ln_8(SiO_4)_6O_2$), thereby preventing or mitigating formation of apatite directly on the barrier surface 300 of the barrier coating 112 and/or within the microstructure of the barrier coating 112. Additionally, or in the alternative, one or more rare earth oxides may interact with calcium oxide constituents in the dust deposits so as to form one or more calcium-rare earth silicate crystal phases preferentially over apatite phases, that disfavor formation of apatite phases, and/or that physically block passages in the barrier coating 112 where apatite may otherwise penetrate into the microstructure of the barrier coating 112. In some embodiments, the consumable coating 102 may be removed and replenished. In this way, one or more ceramic oxide constituents (e.g., silicates, rare earth oxides, rare earth silicates, etc.) may sacrificially interact or combine with the dust deposits, even allowing apatite to form in the consumable coating, but then replenishing the consumable coating 102 at selected operating intervals such that the consumable coating 102 will have sufficient ceramic oxide constituents available to protect the barrier coating 112 from dust deposit attack.

The one or more ceramic oxide constituents in the consumable coating 102 may additionally or alternatively include one or more silicates. In an exemplary embodiment, the consumable coating 102 may include silica. Additionally, or in the alternative, the consumable coating 102 may include one or more silicates in which silica is present in at least some phase domain. By way of example, silica phase domains may be present in a rare earth silicate material, such as a rare earth silicate material formed in the presence of excess silica. The one or more silicates, such as silica, in the consumable coating 102 may interact with the calcium oxide constituents in the dust deposits. The one or more silicates, such as silica, may interact with the calcium oxide constituents, for example, in the presence of high temperature, and reaction products from such interactions may include one or more calcium silicates (e.g., $2CaO \cdot SiO_2$, $3CaO \cdot SiO_2$, $3CaO \cdot 2SiO_2$, $CaO \cdot SiO_2$, $CaSiO_3$, $Ca_3SiO_5$, $Ca_2SiO_4$, and/or $Ca_3Si_2O_7$). The formation of such calcium silicates may remove calcium oxide constituents from being available to form apatite phases. Such calcium silicates also typically exhibit a low bulk density that may offer some flexibility between dust deposits and the barrier coating 112. In this way, the presence of calcium silicates in the dust deposits may allow the dust to flexibly adapt to the thermal expansion or contraction of the barrier coating 112 and thereby reduce the tendency for dust deposits to initiate and propagate cracks that might otherwise arise from a reduced coating strain tolerance and/or a coefficient of thermal expansion mismatch between the barrier coating 112 and the dust deposits.

In an exemplary embodiment, the presently disclosed consumable coatings 102 may include one or more silica, alumina, and/or mullite oxide constituents, and one or more rare earth oxides (e.g., a rare earth silicate). For example, the consumable coating 102 may include a silicate and a rare earth silicate. The one or more silica, alumina, and/or mullite oxide constituents may be combined with the one or more rare earth oxides (e.g., one or more rare earth silicates) to form a homogenous consumable coating. In some embodiments the silicate in a consumable coating may include silica. Additionally, or in the alternative, a consumable coating may include a rare earth oxide and/or alumina. For example, a consumable coating may include silica, and a rare earth oxide and/or alumina. As another example, a consumable coating may additionally or alternatively include a silicate, and a rare earth oxide and/or alumina. In some embodiments, a consumable coating may additionally or alternatively include a rare earth silicate. For example, a consumable coating may include silica, and a rare earth silicate. As another example, a consumable coating may additionally or alternatively include a silicate, and a rare earth oxide and/or alumina. In some embodiments, the consumable coating may additionally or alternatively include mullite. For example, a consumable coating may include silica and mullite. As another example, a consumable coating may additionally or alternatively include a silicate and mullite. In some embodiments, the silicate in a consumable coating may include an aluminosilicate, such as mullite. For example, a consumable coating may include an aluminosilicate, such as mullite, without the presence of another silicate.

As shown in FIG. 3A, the consumable coating 102 may include one or more homogeneous layers applied on the barrier surface 300. Alternatively, as shown in FIGS. 3B-3E, the consumable coating 102 may include a plurality of layers with different compositions. For example, the one or more silica, alumina, and/or mullite oxide constituents may form a first consumable coating layer 302 of the consumable coating 102, and the one or more rare earth oxides (e.g., one or more rare earth silicates) may form a second consumable coating layer 304 of the consumable coating 102. Regardless of whether the consumable coating includes one or more homogenous layers (FIG. 3A) and/or a plurality of layers with different compositions (FIGS. 3B-3E), the consumable coating may be distributed across a respective layer homogenously and/or in a plurality of heterogenous domains.

Figure 3B:
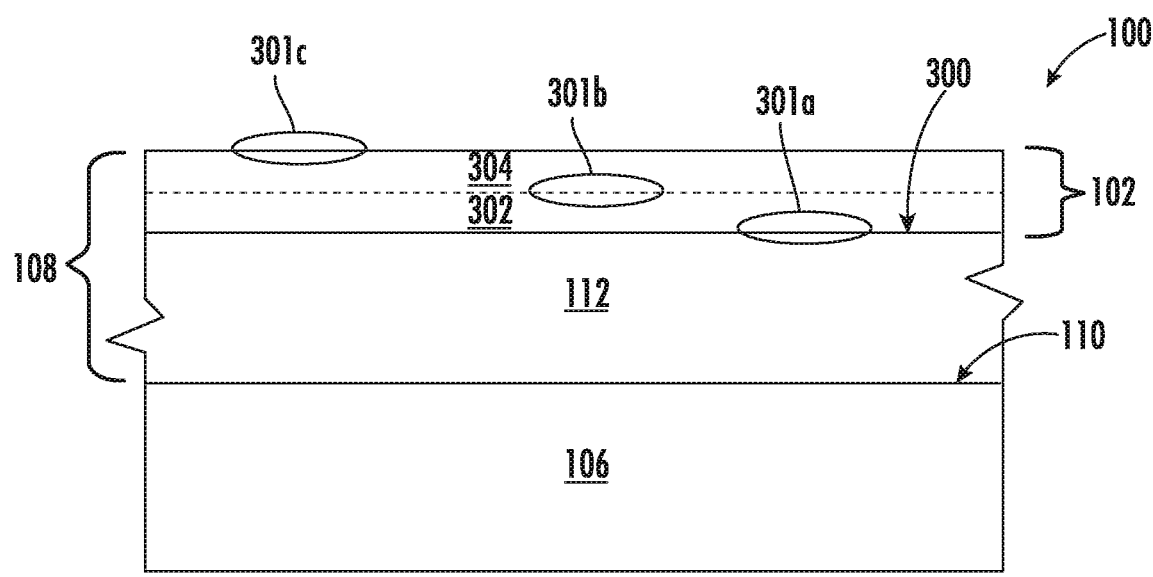
Figure 3C:
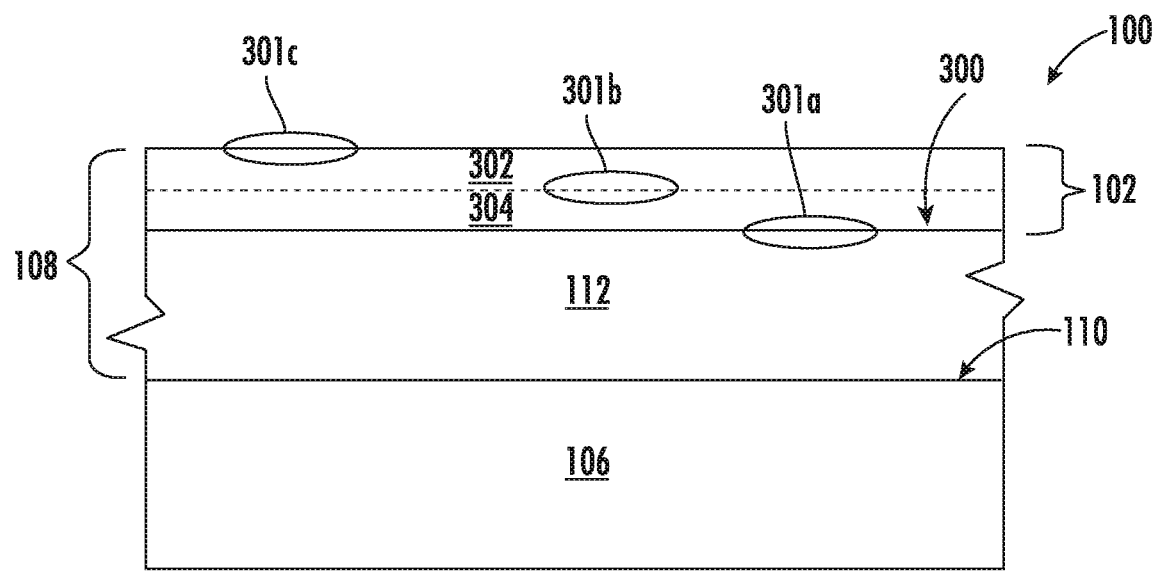

In some embodiments, as shown in FIG. 3B, a first consumable coating layer 302 that includes the one or more silica, alumina, and/or mullite oxide constituents may be applied on the barrier surface 300 of the barrier coating 112, and a second consumable coating layer 304 that includes the one or more rare earth oxides (e.g., one or more rare earth silicates) may be applied on the first consumable coating layer 302. Alternatively, in other embodiments, as shown in FIG. 3C, the second consumable coating layer 304 that includes the one or more rare earth oxides (e.g., one or more rare earth silicates) may be applied on the barrier surface 300, and the first consumable coating layer 302 that includes the one or more silica, alumina, and/or mullite oxide constituents may be applied on the second consumable coating layer 304. The first consumable coating layer may include silica in an amount of from about 40 wt. % to about 100 wt. %, such as from 40 wt. % to about 90 wt. %, such as from about 60 wt. % to about 80 wt. %, such as at least about 60 wt. %, such as at least about 70 wt. %, such as at least about 80 wt. %. The second consumable coating layer may include a rare earth oxide (e.g., a rare earth silica) in an amount of from about 40 wt. % to about 90 wt. %, such as from about 60 wt. % to about 80 wt. %, such as at least 60 wt. %, such as at least 70 wt. %, such as at least 80 wt. %.

In some embodiments, the consumable coating 102 may include a ceramic oxide that includes an organosilicon derivative material, such as silica. An organosilicon derivative material may be derived from an organosilicon binder or other material included in a consumable coating 102 slurry. Advantageously, at least a portion of the organosilicon binder or other material may convert to an organosilicon derivative material such as silica when exposed to high temperature operating conditions such as those typical of a turbomachine. The organosilicon derivative material such as silica resulting from the organosilicon binder or other material may then reduce the concentration and/or activity of calcium oxide constituents in the dust deposits and/or the silica may interact with calcium oxide constituents in the dust deposits.

Figure 3D:
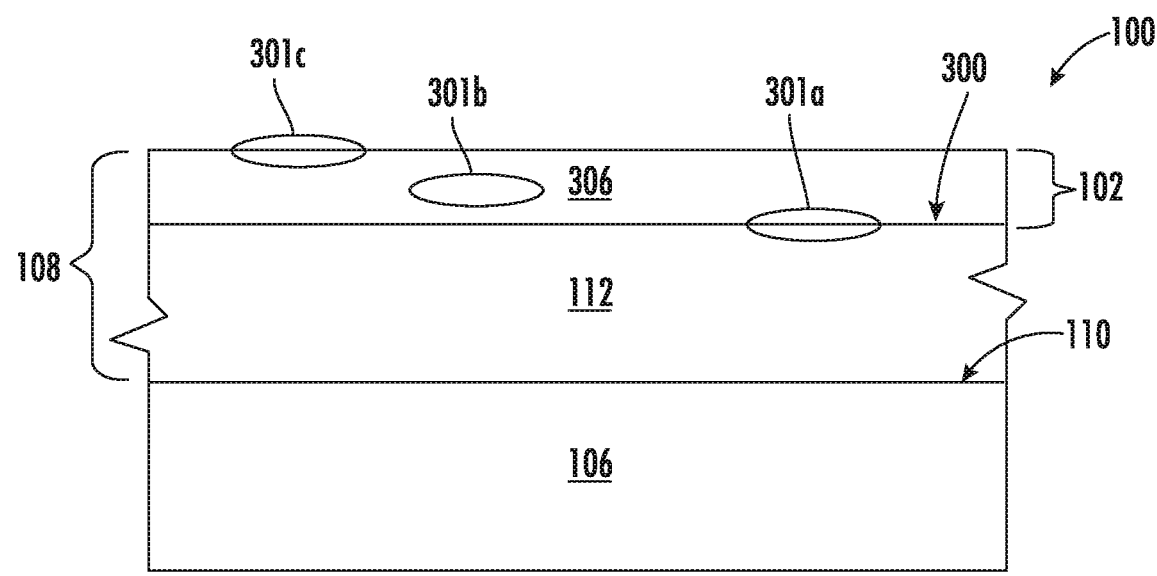

An exemplary consumable coating 102 that includes an organosilicon material may also include one or more ceramic oxide constituents. However, in some embodiments, as shown in FIG. 3D, a consumable coating 102 may include a binder layer 306 that includes an organosilicon material intended to be converted to an organosilicon derivative material such as silica at high temperature, and the resulting silica may be the only ceramic oxide constituent in the consumable coating 102. The organosilicon derivative material such as silica resulting from the organosilicon binder or other material may then reduce the concentration and/or activity of calcium oxide constituents in the dust deposits and/or the silica may interact with calcium oxide constituents in the dust deposits. Alternatively, in other embodiments, the organosilicon binder or other material may be combined with one or more ceramic oxide constituents, such as one or more silica, alumina, and/or mullite oxide constituents and/or one or more rare earth oxides (e.g., one or more rare earth silicates) to form a homogenous consumable coating 102 that includes an organosilicon derivative material. For example, the first consumable coating layer 302 and/or the second consumable coating layer 304 may include an organosilicon derivative material.

Figure 3E:
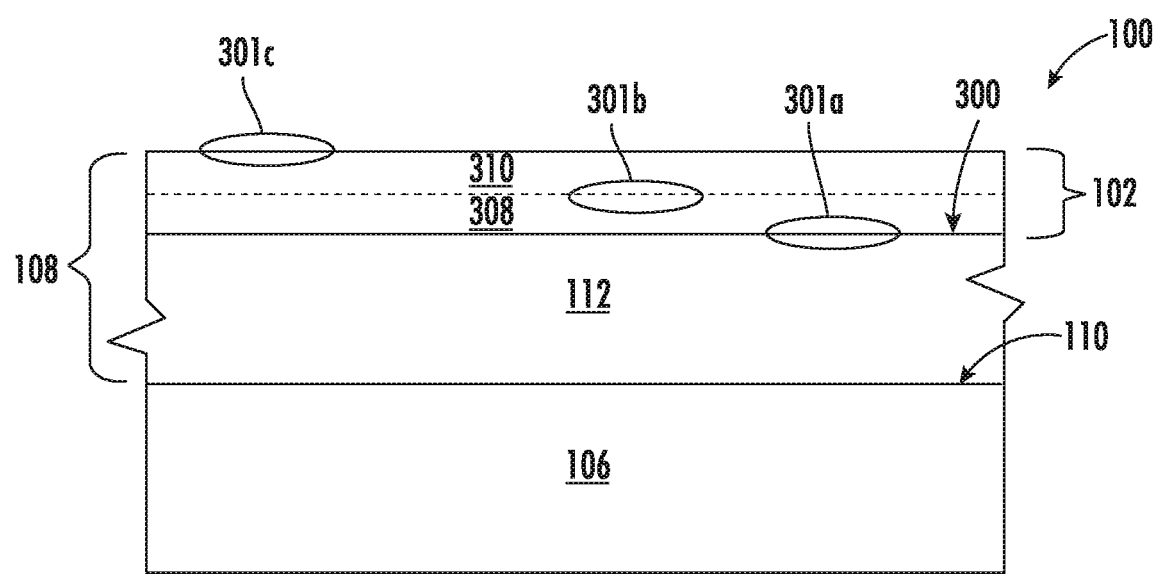

In some embodiments, as shown in FIG. 3E, the consumable coating 102 may include a plurality of layers such that a third consumable coating layer 308 of a consumable coating 102 may include an organosilicon derivative material, and a fourth consumable coating layer 310 of the consumable coating 102 may include one or more silica, alumina, and/or mullite oxide constituents and/or one or more rare earth oxides (e.g., one or more rare earth silicates). As shown in FIG. 3E, the third consumable coating layer 308 that includes the organosilicon derivative material may be applied on the on the barrier surface 300, and the fourth consumable coating layer 310 that includes the one or more silica, alumina, and/or mullite oxide constituents and/or one or more rare earth oxides (e.g., one or more rare earth silicates) may be applied on the third consumable coating layer 308. In addition to the organosilicon derivative material, the third consumable coating layer 308 of the consumable coating 102 may also include one or more silica, alumina, and/or mullite oxide constituents and/or one or more rare earth oxides (e.g., one or more rare earth silicates). For example, the third consumable coating layer 308 of the consumable coating 102 may include one or more silica, alumina, and/or mullite oxide constituents and an organosilicon derivative material, and the fourth consumable coating layer 310 of the consumable coating 102 may include one or more rare earth oxides (e.g., one or more rare earth silicates). As another example, the third consumable coating layer 308 of the consumable coating 102 may include one or more rare earth oxides (e.g., one or more rare earth silicates) and an organosilicon derivative material, and the fourth consumable coating layer 310 may include one or more silica, alumina, and/or mullite oxide constituents. The fourth consumable coating layer 310 may also include an organosilicon derivative material.

In addition to the barrier coating 112, the presently disclosed consumable coatings 102 may protect other coatings or coating layers from dust deposit attack, including bond coats 202, as well as underlying substrates 106. Accordingly, it will be appreciated that the application of a consumable coating 102 onto a barrier surface 300 and the resulting protection of the barrier coating 112 is described by way of example and not to be limiting. In fact, the presently disclosed consumable coatings 102 may be applied to any coating system 108 or substrate 106 and provide resulting protection thereof without departing from the spirit and scope of the present disclosure.

Exemplary ceramic oxides that may be included in a consumable coating 102 include silicon oxide constituents, aluminum oxide constituents, and/or mullite oxide constituents, as well as rare earth oxides, including any of the materials discussed herein with reference to barrier coatings 112 (EBCs and TBCs). Silicon oxide constituents may include, without limitation, silica as well as any other silicate As used herein, the term "rare earth oxide" refers to an oxide compound that includes a rare earth element as one of its composing elements. Exemplary rare earth oxides include oxides of rare earth elements, as well as rare earth silicates. Such oxides of rare earth elements include: $Sc_2O_3$, $Y_2O_3$, $La_2O_3$, $CeO_2$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, or $Lu_2O_3$, as well as combinations of these. Exemplary rare earth oxides also include complex oxides that include a rare earth element and a transition metal element, such as zirconium, hafnium, titanium, or niobium, as well as combinations of these. Such complex oxides include, for example, yttria-stabilized zirconia and yttria-stabilized hafnia.

Exemplary rare earth silicates include rare earth monosilicates having the formula $Ln_2SiO_5$ and rare earth disilicates having the formula $Ln_2Si_2O_7$, as well as combinations of these. Suitable rare earth silicates include, but are not limited to, monosilicates and/or di silicates of: lanthanum (La), cerium (Ce), praseodymium (Pr), neodymium (Nd), samarium (Sm), europium (Eu), gadolinium (Gd), terbium (Tb), dysprosium (Dy), holmium (Ho), yttrium (Y), erbium (Er), thulium (Tm), ytterbium (Yb), lutetium (Lu), or scandium (Sc), as well as combinations thereof. By way of example, rare earth silicates include: yttrium silicates (e.g., $Y_2SiO_5$ and/or $Y_2Si_2O_7$), gadolinium silicates (e.g., $Gd_2SiO_5$ and/or $Gd_2Si_2O_7$), ytterbium silicates (e.g., $Yb_2SiO_5$ and/or $Yb_2Si_2O_7$), erbium silicates (e.g., $Er_2SiO_5$ and/or $Er_2Si_2O_7$), as well as combinations of these.

A consumable coating may include one or more rare earth silicates. By way of example, a consumable coating may include: lanthanum silicate (e.g., $La_2SiO_5$ and/or $La_2Si_2O_7$), cerium silicate (e.g., $Ce_2SiO_5$ and/or $Ce_2Si_2O_7$), praseodymium silicate (e.g., $Pr_2SiO_5$ and/or $Pr_2Si_2O_7$), neodymium silicate (e.g., $Nd_2SiO_5$ and/or $Nd_2Si_2O_7$), samarium silicate (e.g., $Sm_2SiO_5$ and/or $Sm_2Si_2O_7$), europium silicate (e.g., $Eu_2SiO_5$ and/or $Eu_2Si_2O_7$), gadolinium silicate (e.g., $Gd_2SiO_5$ and/or $Gd_2Si_2O_7$), terbium silicate (e.g., $Tb_2SiO_5$ and/or $Tb_2Si_2O_7$), dysprosium silicate (e.g., $Dy_2SiO_5$ and/or $Dy_2Si_2O_7$), holmium silicate (e.g., $Ho_2SiO_5$ and/or $Ho_2Si_2O_7$), yttrium silicate (e.g., $Y_2SiO_5$ and/or $Y_2Si_2O_7$), or erbium silicate (e.g., $Er_2SiO_5$ and/or $Er_2Si_2O_7$), as well as combinations of these.

It is believed that, in some embodiments, the crystal phases formed when dust deposits interact with a rare earth silicate at high temperature may depend on the ionic radius of the rare earth element of the rare earth silicate. In particular, rare earth silicates with relatively smaller ionic radius rare earth elements may interact with calcium oxide constituents in the dust deposits to preferentially form other calcium-rare earth silicate crystal phases over apatite (e.g., $Ca_2Ln_8(SiO_4)_6O_2$), while silicates with relatively larger ionic radius rare earth elements may readily form apatite from the calcium oxide constituents in the dust deposits.

Table 1 shows an ionic radius of respective rare earth elements, for a +3 valence state, coordination number 6. In exemplary embodiments, a rare earth silicate may include a rare earth element with an ionic radius of from about 0.745 Angstroms (Å) to about 1.032 Å, such as from about 0.880 Å to about 1.032 Å, or such as from about 0.890 Å to about 0.958 Å.

TABLE 1

Ionic Radius of Rare Earth Elements

| Rare Earth Element | Ionic Radius (Angstrom), +3/CN6 |
|---|---|
| Lanthanum (La) | 1.032 |
| Cerium (Ce) | 1.010 |
| Praseodymium (Pr) | 0.990 |
| Neodymium (Nd) | 0.983 |
| Samarium (Sm) | 0.958 |
| Europium (Eu) | 0.947 |
| Gadolinium (Gd) | 0.938 |
| Terbium (Tb) | 0.923 |
| Dysprosium (Dy) | 0.912 |
| Holmium (Ho) | 0.901 |
| Yttrium (Y) | 0.900 |
| Erbium (Er) | 0.890 |
| Thulium (Tm) | 0.880 |
| Ytterbium (Yb) | 0.868 |
| Lutetium (Lu) | 0.861 |
| Scandium (Sc) | 0.745 |

In some embodiments, a consumable coating 102 may include a rare earth silicate in which the rare earth element has an ionic radius larger than or equal to that of erbium (Er). Such a rare earth silicate may be included in the consumable coating 102 so as to preferentially form apatite when the rare earth silicate interacts with calcium oxide constituents in the dust deposits. In this way, apatite may readily form from interaction with the consumable coating 102 rather than from interaction with the barrier coating 112. For example, such a rare earth silicate may include lanthanum silicates (e.g., $La_2SiO_5$ and/or $La_2Si_2O_7$), cerium silicates (e.g., $Ce_2SiO_5$ and/or $Ce_2Si_2O_7$), praseodymium silicates (e.g., $Pr_2SiO_5$ and/or $Pr_2Si_2O_7$), neodymium silicates (e.g., $Nd_2SiO_5$ and/or $Nd_2Si_2O_7$), samarium silicates (e.g., $Sm_2SiO_5$ and/or $Sm_2Si_2O_7$), europium silicates (e.g., $Eu_2SiO_5$ and/or $Eu_2Si_2O_7$), gadolinium silicates (e.g., $Gd_2SiO_5$ and/or $Gd_2Si_2O_7$), terbium silicates (e.g., $Tb_2SiO_5$ and/or $Tb_2Si_2O_7$), dysprosium silicates (e.g., $Dy_2SiO_5$ and/or $Dy_2Si_2O_7$), holmium silicates (e.g., $Ho_2SiO_5$ and/or $Ho_2Si_2O_7$), yttrium silicates (e.g., $Y_2SiO_5$ and/or $Y_2Si_2O_7$), or erbium silicates (e.g., $Er_2SiO_5$ and/or $Er_2Si_2O_7$), as well as combinations of these.

Alternatively, in some embodiments, a consumable coating 102 may include a rare earth silicate in which the rare earth element has an ionic radius of ytterbium (Yb) or smaller. Such a rare earth silicate may be included in the consumable coating 102 so as to minimize or eliminate apatite formation when the rare earth silicate interacts with calcium oxide constituents in the dust deposits. For example, such a rare earth silicate may include ytterbium silicates (e.g., $Yb_2SiO_5$ and/or $Yb_2Si_2O_7$), lutetium silicates (e.g., $Lu_2SiO_5$ and/or $Lu_2Si_2O_7$), or scandium silicates (e.g., $Sc_2SiO_5$ and/or $Sc_2Si_2O_7$), as well as combinations of these. In some embodiments, the consumable coating 102 containing such other crystal phases may be removed or gradually wear down over a period of normal operation, thereby sacrificially protecting the barrier coating 112 from the harmful effects of apatite formed from the dust deposits. Thereafter, the consumable coating 102 may be replenished as desired.

When the consumable coating 102 includes an organosilicon, such as an organosilicon binder, the organosilicon binder may include any oligomer or polymer that includes a siloxane (i.e., an Si—O—Si backbone or linkage) and/or a siloxy (i.e., $R_3SiO$—) functional group. The organosilicon may impart strength to the consumable coating 102 in the as-dried and partially thermally decomposed conditions, while advantageously forming silica ash in the fully decomposed condition. For example, the organosilicon may include a polysiloxane, such as, but not limited to, poly(dimethylsiloxane) (PDMS), polyvinyl siloxane (PVS), and poly(imide-co-siloxane) (PIS), as well as combinations of these.

When the consumable coating 102 is applied in the form of a slurry suspension, the slurry suspension may include various organic processing aids, such as organic solvents, dispersants, surfactants, plasticizers, additives for controlled dispersion, thickeners, organosilicon binders, and so forth. Exemplary organic solvents may include methanol, ethanol, propanol, butanol, pentanol, hexanol, heptanol, octanol, acetone, diacetone alcohol, methyl isobutyl ketone (MIBK), methyl ethyl ketone (MEK), ketone (e.g., dialkyl ketone such as pentanone), toluene, heptane, or xylene, as well as combinations of these. Exemplary dispersants may include polyacrylic acid, polyacrylic acid-polyethylene oxide copolymers, polymethacrylic acid, polyethylenimine, ammonium polyacrylate, ammonium polymethacrylate, sulfonated naphthalene formaldehyde condensate, or polyvinyl sulfonic acid, as well as combinations of these. Exemplary plasticizers may include ethylene glycol, diethylene glycol, triethylene glycol, tetraethylene glycol glycerol, glycerin, polyethylene glycol, or diethylene glycol monobutyl ether, as well as combinations of these. Exemplary surfactants may include fluorocarbons, dimethylsilicones, or acetylenic glycol chemistries, as well as combinations of these. Exemplary additives for controlled dispersion may include citric acid, glycine, dextrose, sucrose, mannose, tartaric acid, or oxalic acid, as well as combinations of these. Exemplary thickeners may include xanthan gum, polyethylene oxide, guar gum, methylcellulose and other soluble fiber, polyacrylic acid, or polyvinylpyrolidone, as well as mixtures of these. In addition, or as an alternative to an organosilicon binder, the consumable coating 102 may include other binder agents, including a latex binder such as polystyrene, polyvinyl alcohol, polyvinyl butyrol, styrene-butadiene copolymer, polyacrylic acid, polyacrylates, acrylic polymers, polymethyl methacrylate/polybutyl acrylate, polyvinyl acetate, polyvinyl malate, natural latex rubber, and mixtures thereof. In general, these organic processing aids may include carbon and other elements that volatilize during processing and/or exposure to operating environments such that they are not permanently present in the consumable coating 102.

In one embodiment, a slurry suspension can be formed by combining the primary consumable coating material(s) (e.g., one or more ceramic oxides such as silica, alumina, and/or mullite oxide constituents, rare earth oxides, rare earth silicates, etc.) with liquid carrier and mixing until adequately dispersed. Optionally, one or more organic processing aids may be used, including a solvent, dispersant, surfactant, plasticizer, and so forth. Exemplary liquid carriers may include water and/or an organic solvent, such as an alcohol and/or a ketone. Additionally, a mixing media may be used, such as an alumina or zirconia mixing media. The mixture can be mixed using conventional techniques known to those skilled in the art, including shaking, ball milling, attritor milling, planetary ball milling, or mechanical mixing or stirring, optionally with simultaneous application of ultrasonic energy. The mixing media or ultrasonic energy can break apart any agglomerated ceramic particles in the slurry. Any mixing media present may subsequently be removed by straining, for example.

The slurry may include any suitable solids loading, which may depend, for example, on the type of application (e.g., rolling, spraying, etc.), the desired thickness of the consumable coating layer, and the component(s) to which the consumable coating is to be applied. In some embodiments, the solids loading may be from about 5% to about 40% by weight based on the weight of the final slurry formulation, such as from about 10 wt. % to about 30 wt. %, such as from about 15 wt. % to about 40 wt. %, such as from about 15 wt. % to about 25 wt. %, or such as from about 18 wt. % to about 25 wt. %. The slurry may include a binder, such as an organosilicon or latex material in an amount from about 0.1% to about 5% by weight based on the weight of the final slurry formulation, such as from about 1 wt. % to about 4 wt. %, such as about 1.5 wt. % to about 2.5 wt. %. The solids in the consumable coating slurry may have a median particle size of from about 0.1 microns (μm) to about 8 μm, such as from about 0.2 μm to about 6 μm, such as from about 1 μm to about 4 μm, such as from about 0.5 μm to 2.5 μm.

Thickener may be added to the slurry suspension if desired and the resulting mixture may be agitated by such methods as mechanical stirring, rolling, blending, shaking, and other like methods. Once the thickener is fully dissolved, any secondary additive for controlled dispersion can be added if desired, and the resulting slurry may again be mixed using any of the above listed methods until the secondary additive dissolves.

The slurry may be mixed by slow rolling, slow mechanical mixing, or other like methods to avoid trapping air bubbles in the slurry. This light mixing can be continued indefinitely, or alternately, once mixed, the slurry can be set aside until needed for application.

Those skilled in the art will understand that the previous embodiment is one method for making the slurry compositions described herein, and that other methods are also acceptable.

If desired, masking can be applied to the component 100 or other nearby components before the slurry suspension is applied to prevent coating specific areas of the component 100 or such nearby component. Masking may be accomplished using conventional techniques known to those skilled in the art including, but not limited to, tapes, conformal maskents, stencils, and paint-on maskents. Once all desired masking is complete, the slurry suspension can be sprayed to coat the component 100 with the consumable coating 102. The consumable coating may be sprayed to the surface of turbomachinery components using appropriate access tooling, for example, during field service.

The consumable coating 102 may be applied in a sufficient quantity to provide one or more layers that have a suitable thickness. By way of example, a consumable coating 102 and/or a layer of a consumable coating 102 may have a thickness of from about 10 microns to about 250 microns, such as from about 10 microns to about 125 microns, such as from about 10 microns to about 75 microns, or such as from about 5 microns to about 30 microns.

Once the slurry suspension has been applied to the component 100, and while the slurry is still wet, it may be leveled to remove excess slurry material. Leveling may be carried out using conventional techniques such as, but not limited to, spinning, rotating, or slinging the component 100, dripping with or without applied vibration, or using an air knife, a doctor blade, or the like, to remove excess slurry material. Similar to slurry application, leveling can be conducted manually or it may be automated, and it can be carried out in a humid environment because if the slurry dries too quickly, it can lead to defects in the coating during leveling.

Next, the component 100 can be dried. Drying may be carried out in ambient or controlled temperature and humidity conditions. In one embodiment, controlled temperature and humidity can be utilized to help maintain the integrity of the applied slurry coating. More particularly, in one embodiment, drying may be carried out at temperatures of from about 5° C. to about 150° C., and in another embodiment, from about 20° C. to about 30° C. Drying may also take place in the engine environment after applying the coating 102 in an "on-wing" application.

After drying, any masking present may be removed by peeling off tapes and adhesives, burn-off of tapes and adhesives, or by removing multi-use tooling. Any rough edges remaining after masking removal may be scraped or cut away using conventional means.

In some embodiment, burnout of the organic processing aids may be carried out by exposing the components 100 to an elevated temperature environment so that the organic processing aids can be burned off. When the coating is applied in the field, or on-wing, the burnout process may be carried out, for example, by operating the turbomachine that includes the coated components 100 according to a burnout schedule. Alternatively, burnout may be allowed to occur inherently from normal turbomachine operation. In one embodiment, burnout of the organic processing aids may be accomplished when the coated components 100 are heated to about 400° C. to about 1400° C. (e.g., about 600° C. to about 800° C.) and holding the component 100 at this temperature for from about 0.05 to about 2 hours.

Figure 4:
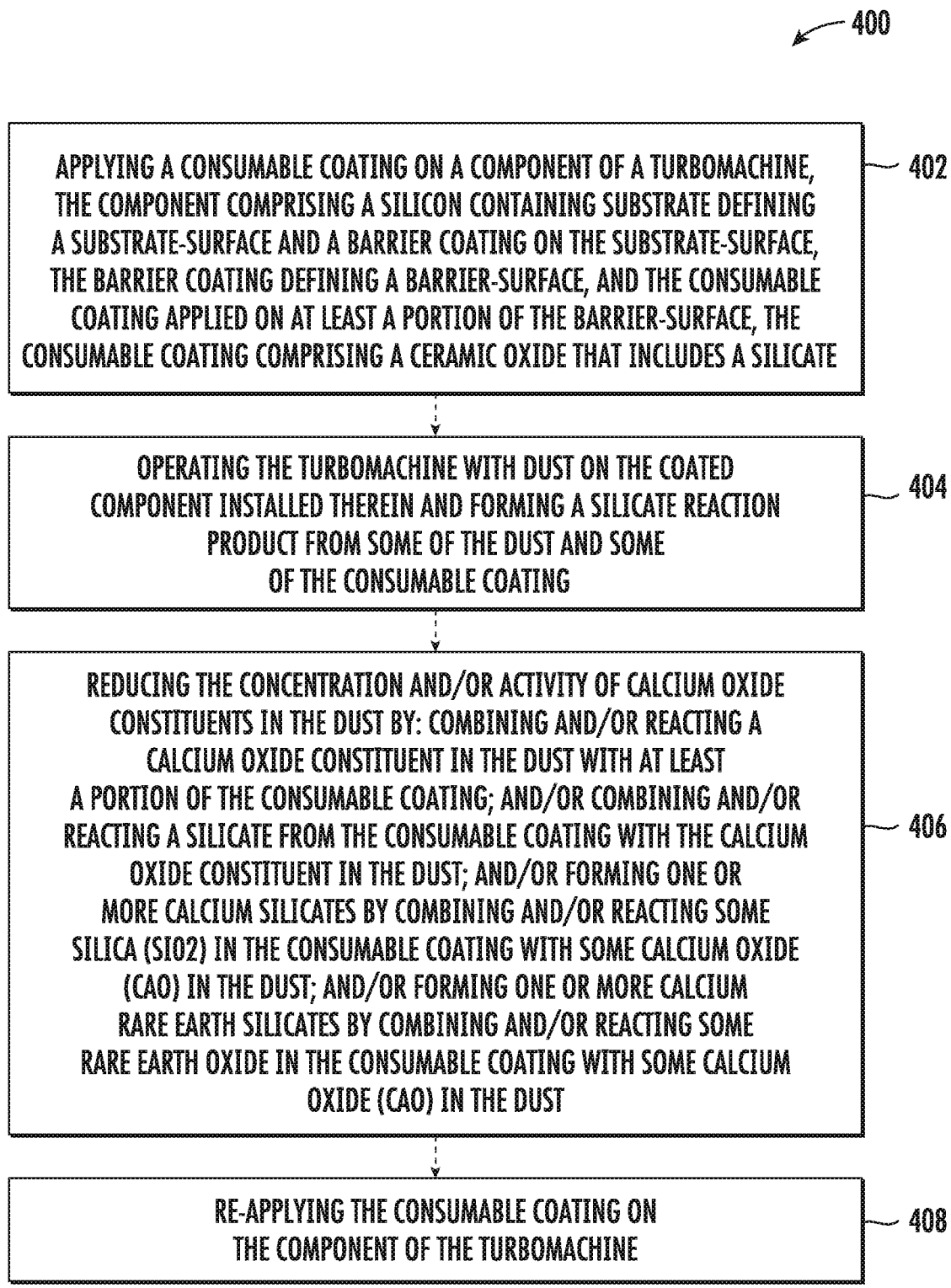
FIG. 4 shows a flowchart depicting an exemplary method of protecting a component from dust deposits, such as molten dust.

Now referring to FIG. 4, an exemplary method of protecting a component 100 from dust deposits will be described. The component 100 may include one or more components 100 installed in a turbomachine or any other high temperature environment. An exemplary method 400 may include, at step 402, applying a consumable coating 102 on a component 100 of a turbomachine. The component may include a silicon containing substrate 106 defining a substrate surface 110 and a barrier coating 112 on the substrate surface 110, with the barrier coating 112 defining a barrier surface 300, and the consumable coating 102 applied on at least a portion of the barrier surface 300. The consumable coating may include a ceramic oxide, and the ceramic oxide may include a silicate.

The consumable coating 102 may be applied on the component 100 of the turbomachine, at step 402, while the component 100 is disposed in a turbomachine that is fully or partially assembled. In some embodiments, the consumable coating may be applied "in the field" or "on-wing". The consumable coating 102 may be applied without the need to disassemble the turbomachine, and thus, without requiring downtime to fully or even partially disassemble the turbomachine. For example, the consumable coating may be applied, at step 402, at least in part by spraying the consumable coating 102 onto components 100 of the turbomachine using an applicator 116, which may be accessible through one or more access ports in the casing of the turbomachine, such as borescope ports, igniter ports, fuel nozzle ports, and the like. In some embodiments, it may be desirable to additionally or alternatively apply the consumable coating while the turbomachine is partially disassembled, such as during other maintenance activities.

In some embodiments, the method 400 may further include, at step 404, operating the turbomachine with dust deposits on the coated component 100 installed therein and forming a silicate reaction product from some of the dust deposits some of the consumable coating 102. The dust deposits may come from a dusty or sandy operating environment such as those in proximity to a desert or other dusty or sandy terrain where elevated levels of dust and other contaminants may be prevalent.

The method 400 may further include, at step 406, reducing the concentration and/or activity of calcium oxide constituents in the dust deposits. Step 406 may include combining and/or reacting a calcium oxide constituent in the dust deposits with at least a portion of the consumable coating 102. Step 406 may additionally or alternatively include combining and/or reacting a silicate from the consumable coating 102 with the calcium oxide constituent in the dust deposits. Step 406 may further additionally or alternatively include preferentially forming one or more calcium silicates by combining and/or reacting some silica in the consumable coating with some calcium oxide in the dust deposits. Step 406 may further additionally or alternatively include preferentially forming one or more calcium rare earth silicates by combining and/or reacting some rare earth oxide in the consumable coating with some calcium oxide in the dust deposits. In some embodiments, the rare earth oxide may include a rare earth silicate. The step 406 of reducing the concentration and/or activity of calcium oxide constituents in the dust deposits may reduce apatite formation. Additionally, or in the alternative, as a result of step 406 the amount of calcium oxide constituents physically available to interact with the barrier coating 112 may be reduced. Optionally, the one or more calcium silicates may include: $2CaO \cdot SiO_2$, $3CaO \cdot SiO_2$, $3CaO \cdot 2SiO_2$, $CaO \cdot SiO_2$, $CaSiO_3$, $Ca_3SiO_5$, $Ca_2SiO_4$, or $Ca_3Si_2O_7$, as well as combinations of these. The formation of such calcium silicates may remove a calcium oxide constituent (e.g., CaO) from being available to form apatite phases.

In other embodiments, the combining and/or reacting step 406 may additionally or alternatively include preferentially forming a calcium-rare earth silicate by combining and/or reacting some rare earth oxide from the consumable coating 102 with a calcium oxide constituent from the dust deposits. For example, the rare earth oxide may include a rare earth silicate that includes a rare earth element with an ionic radius equal to or smaller than that of europium (Eu), such that the apatite may more readily form at least in part because of the ionic radius of the rare earth element more closely matching the ionic radius of calcium. Alternatively, the combining and/or reacting step 406 may include minimizing apatite formation by combining and/or reacting some rare earth oxide from the consumable coating 102 with a calcium oxide constituent from the dust deposits. For example, the rare earth oxide may include a rare earth silicate that includes a rare earth element with an ionic radius larger than that of europium (Eu), such that apatite formation may be minimized or eliminated.

In still further embodiments, the consumable coating 102 may additionally or alternatively include a silicate derived at least in part from an organosilicon material, and an exemplary method 400 may include converting at least a portion of the organosilicon material to silica when operating the turbomachine. Additionally, the exemplary method 400 may include combining and/or reacting some of the silica derived from the organosilicon material with a calcium oxide constituent from the dust deposits.

In some embodiments, the exemplary method 400 may include, at step 408, re-applying the consumable coating on the component of the turbomachine, for example, after operating the turbomachine for some period of time. A consumable coating 102 may be re-applied in a same or similar manner as described with reference to step 402, including, for example, re-applying the consumable coating 102 "in the field" or "on-wing". In these cases, re-application may be carried out without the need to disassemble the turbomachine. However, in some embodiments, it may be desirable to additionally or alternatively apply the consumable coating 102 while the turbomachine is partially disassembled. For example, the consumable coating may be applied in connection with maintenance or repair activities that include at least some disassembly of the turbomachine. The consumable coating may be re-applied at any desired operating interval, which may be selected, for example, based at least in part on the observed or expected nature of the operating environment and/or the observed or expected condition of the consumable coating after operation for one or more operating intervals.

In some embodiments, the consumable coating may be re-applied at step 408 based at least in part on the observed or expected extent of combining and/or reacting having occurred (e.g., at step 406) and/or based at least in part on the observed or expected extent of combining and/or reacting having occurred (e.g., at step 406). In some embodiments, a consumable coating may be applied and/or re-applied to a component with a barrier coating that has at least one delaminated region. The barrier coating in the delaminated region may be partially missing and/or fully missing. For example, the delaminated region may have incurred delamination or spalling. In some embodiments, the entire surface of the component may be substantially free of barrier coating material. The consumable coating may nevertheless provide protection to the remaining barrier coating and/or the underlying substrate of the component. For example, even in areas where the barrier coating may have incurred delamination or spalling, the consumable coating may protect the underlying substrate by reducing the volatilization rate of silica from substrate materials (e.g., SiC—SiC CMC substrate materials).

Examples

Various slurry suspensions that include a silicate were prepared and used to form a consumable coating 102 on a substrate. An exemplary slurry suspensions contained silica dispersed in ethanol to 20% solids loading by weight. Another exemplary slurry suspensions contained silica and gadolinium silicate. The resulting slurry suspensions were applied to the surface of a coupon that included a rare earth-disilicate barrier coating on a silicon carbide substrate, providing a 1-mil thick consumable coating on the surface of the rare earth-disilicate barrier coating. Two-layer consumable coatings were also formed. Exemplary two-layer consumable coatings included a first layer that contained silica and a second layer that contained gadolinium silicate. In some examples the first layer was applied on the coupon and the second layer was applied on the first layer, and in some examples the second layer was applied on the coupon and the first layer was applied on the second layer. An exemplary consumable coating included silica, a rare earth silicate, alumina, mullite, and an organosilicon material, with solids having a median particle size from about 0.1 microns (μm) to about 4 μm dispersed in a solvent comprising ethanol and pentanone.

A cyclic thermal gradient test was performed on the coupons that included the consumable coating as well as a coupon without the consumable coating to obtain a baseline for comparison.

The amount of barrier coating volume loss from the thermal gradient test was measured after each thermal cycle, demonstrating that each of the example consumable coatings significantly prolonged the number of thermal cycles before barrier coating loss was observed.

Further aspects of the presently disclosed subject matter are provided by the following clauses:

1. A coated component, comprising: a silicon containing substrate defining a substrate surface; a barrier coating on the substrate surface, the barrier coating defining a barrier surface; and a consumable coating on the barrier surface, the consumable coating comprising a ceramic oxide that includes a silicate.

2. The coated component of any preceding clause, wherein the silicate comprises silica.

3. The coated component of any preceding clause, wherein the consumable coating comprises a rare earth oxide and/or alumina.

4. The coated component of any preceding clause, wherein the rare earth oxide comprises: $Sc_2O_3$, $Y_2O_3$, $La_2O_3$, $CeO_2$, $Pr_2O_3$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, and/or $Lu_2O_3$.

5. The coated component of any preceding clause, wherein the consumable coating comprises a rare earth silicate.

6. The coated component of any preceding clause, wherein the rare earth silicate comprises a monosilicate and/or a disilicate of: scandium (Sc), yttrium (Y), lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and/or lutetium (Lu).

7. The coated component of any preceding clause, wherein the rare earth silicate comprises: lanthanum silicate (e.g., $La_2SiO_5$ and/or $La_2Si_2O_7$), cerium silicate (e.g., $Ce_2SiO_5$ and/or $Ce_2Si_2O_7$), praseodymium silicate (e.g., $Pr_2SiO_5$ and/or $Pr_2Si_2O_7$), neodymium silicate (e.g., $Nd_2SiO_5$ and/or $Nd_2Si_2O_7$), samarium silicate (e.g., $Sm_2SiO_5$ and/or $Sm_2Si_2O_7$), europium silicate (e.g., $Eu_2SiO_5$ and/or $Eu_2Si_2O_7$), gadolinium silicate (e.g., $Gd_2SiO_5$ and/or $Gd_2Si_2O_7$), terbium silicate (e.g., $Tb_2SiO_5$ and/or $Tb_2Si_2O_7$), dysprosium silicate (e.g., $Dy_2SiO_5$ and/or $Dy_2Si_2O_7$), holmium silicate (e.g., $Ho_2SiO_5$ and/or $Ho_2Si_2O_7$), yttrium silicate (e.g., $Y_2SiO_5$ and/or $Y_2Si_2O_7$), and/or erbium silicate (e.g., $Er_2SiO_5$ and/or $Er_2Si_2O_7$).

8. The coated component of any preceding clause, wherein the consumable coating comprises a first consumable coating layer and a second consumable coating layer, the first consumable coating layer comprising silica and the second consumable coating layer comprising a rare earth oxide (e.g., a rare earth silicate).

9. The coated component of any preceding clause, wherein: the first consumable coating layer is applied on the barrier coating and the second consumable coating layer is applied on the first consumable coating layer; or the second consumable coating layer is applied on the barrier coating and the first consumable coating layer is applied on the second consumable coating layer.

10. The coated component of any preceding clause, wherein the consumable coating comprises silica and gadolinium silicate.

11. The coated component of any preceding clause, wherein the consumable coating comprises: silica, alumina, magnesia, mullite, and/or a rare earth oxide.

12. The coated component of any preceding clause, wherein the consumable coating comprises: an aluminosilicate such as mullite; or alumina and/or mullite.

13. The coated component of any preceding clause, wherein the consumable coating comprises a ceramic oxide comprising an organosilicon derivative material.

14. The coated component of claim 1, wherein the consumable coating has a thickness of from 10 microns to 75 microns.

15. The coated component of any preceding clause, wherein the consumable coating comprises silica and a rare earth silicate that includes a rare earth element with an ionic radius equal to or smaller than that of europium (Eu); and/or wherein the consumable coating comprises silica and a rare earth silicate that includes a rare earth element with an ionic radius larger than that of europium (Eu).

16. The coated component of any preceding clause, wherein the consumable coating comprises silica, a rare earth silicate, alumina, mullite, and an organosilicon material, the consumable coating having been applied to the component by application of a slurry comprising solids having a median particle size from about 0.1 microns (μm) to about 4 μm dispersed in a solvent comprising ethanol and pentanone.

17. A method of protecting a component of a turbomachine from dust deposits, the method comprising: applying a consumable coating on a component of a turbomachine, the component comprising a silicon containing substrate defining a substrate surface and a barrier coating on the substrate surface, the barrier coating defining a barrier surface, and the consumable coating applied on at least a portion of the barrier surface, the consumable coating comprising a ceramic oxide that includes a silicate.

18. The method of any preceding clause, wherein the silicate from the consumable coating comprises silica and/or a rare earth oxide (e.g. a rare earth silicate).

19. The method of any preceding clause, wherein the consumable coating is applied as a slurry comprising solid particles in a liquid carrier.

20. The method of any preceding clause, wherein the solid particles have a median particle size of from about 0.1 microns to about 8 microns.

21. The method of any preceding clause, wherein the slurry comprises a solids loading of from about 15 wt. % to about 40 wt. %.

22. The method of any preceding clause, wherein the liquid carrier comprises an organosilicon material.

23. The method of any preceding clause, wherein the organosilicon material comprises from about 1 wt. % to about 4 wt. % of the total content of the slurry.

24. The method of any preceding clause, comprising: converting at least a portion of the organosilicon material converts to an organosilicon derivative material upon operating the turbomachine.

25. The method of any preceding clause, wherein the liquid carrier comprises an alcohol and/or a ketone.

26. The method of any preceding clause, comprising: reducing the concentration and/or activity of calcium oxide constituents in the dust deposits by: combining and/or reacting a calcium oxide constituent in the dust deposits with at least a portion of the consumable coating; and/or combining and/or reacting a silicate from the consumable coating with the calcium oxide constituent in the dust deposits; and/or forming one or more calcium silicates by combining and/or reacting some silica in the consumable coating with some calcium oxide in the dust deposits; and/or forming one or more calcium rare earth silicates by combining and/or reacting some rare earth oxide in the consumable coating with some calcium oxide in the dust deposits.

27. The method of any preceding clause, comprising: preferentially forming apatite by combining and/or reacting some of the rare earth oxide from the consumable coating with a calcium oxide constituent from the dust deposits, the rare earth oxide comprising a rare earth silicate that includes a rare earth element with an ionic radius equal to or smaller than that of europium (Eu); or reducing formation of apatite by combining and/or reacting some of the rare earth oxide from the consumable coating with a calcium oxide constituent from the dust deposits, the rare earth oxide comprising a rare earth silicate that includes a rare earth element with an ionic radius larger than that of europium (Eu).

28. The method of any preceding clause, wherein the consumable coating comprises a silicate derived at least in part from an organosilicon material.

29. The method of any preceding clause, comprising: converting at least a portion of the organosilicon material to silica when operating the turbomachine; and combining and/or reacting some of the silica with a calcium oxide constituent from the dust deposits.

30. The method of any preceding clause, wherein the component comprises at least one delaminated region, the barrier coating being partially missing or fully missing in the delaminated region.

31. The method of any preceding clause, wherein applying the consumable coating on the component comprises applying the consumable coating on the component while the component is disposed in a turbomachine that is fully assembled or partially assembled.

32. The method of any preceding clause, comprising: applying the consumable coating on the component by application of a slurry comprising solids having a median particle size from about 0.1 microns (μm) to about 4 μm dispersed in a solvent comprising ethanol and pentanone, wherein the consumable coating comprises silica, a rare earth silicate, alumina, mullite, and an organosilicon derivative material.

33. The method of any preceding clause, comprising: operating the turbomachine with dust deposits on the coated component installed therein and forming a silicate reaction product from some of the dust deposits and some of the consumable coating.

34. A turbomachine, comprising: one or more coated components, the one or more coated components comprising a substrate defining a substrate surface and a coating system applied on the substrate surface, the coating system comprising: a bond coat on the substrate surface; a TGO layer on the surface of the bond coat; a barrier coating on the surface of the TGO layer, the barrier coating defining a barrier surface; and a consumable coating on the barrier surface, the consumable coating comprising a ceramic oxide that includes a silicate.

35. The turbomachine of any preceding clause, comprising the coated component of any preceding clause.

36. The turbomachine of any preceding clause, comprising a coated component having been subjected to the method of any preceding clause.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component of a turbomachine comprising:
    a silicon containing substrate defining a substrate surface, the silicon containing substrate comprising a ceramic matrix composite (CMC);
    an environmental barrier coating defining a surface on the substrate surface, the environmental barrier coating comprising a rare earth silicate, an aluminosilicate, or a combination thereof, wherein the environmental barrier coating has a thickness from 25 micrometers (µm) to 2,000 µm; and
    a consumable coating on the surface of the environmental barrier coating configured to increase a number of thermal cycles before a decrease in the thickness of the environmental barrier coating is observed relative to a coated component without the consumable coating, the consumable coating comprising 40 wt. % to 100 wt. % silica and 0 wt. % to 60 wt. % alumina.

2. The coated component of claim 1, wherein the consumable coating further comprises a rare earth oxide.

3. The coated component of claim 1, wherein the consumable coating further comprises a rare earth silicate.

4. The coated component of claim 3, wherein the rare earth silicate comprises:
    lanthanum silicate, cerium silicate, praseodymium silicate, neodymium silicate, samarium silicate, europium silicate, gadolinium silicate, terbium silicate, dysprosium silicate, holmium silicate, yttrium silicate, erbium silicate, or any combination thereof.

5. The coated component of claim 1, wherein the consumable coating comprises a first consumable coating layer and a second consumable coating layer, wherein the second consumable coating layer comprises silica, alumina, and a rare earth silicate.

6. The coated component of claim 1, wherein the consumable coating further comprises mullite.

7. The coated component of claim 1, wherein the consumable coating has a thickness of from 10 microns to 75 microns.

8. A method of protecting a component of a turbomachine from dust deposits, the method comprising:
    applying a consumable coating on the component of the turbomachine, the component comprising a silicon containing substrate comprising a ceramic matrix composite and defining a substrate surface and an environmental barrier coating on the substrate surface, the environmental barrier coating defining a surface and comprising a rare earth silicate, an aluminosilicate, or a combination thereof, wherein the environmental barrier coating has a thickness from 25 micrometers (µm) to 2,000 µm, and the consumable coating applied on at least a portion of the barrier surface, the consumable coating configured to increase a number of thermal cycles before a decrease in the thickness of the environmental barrier coating is observed relative to a coated component without the consumable coating, wherein the consumable coating comprises 40 wt. % to 100 wt. % silica and 0 wt. % to 60 wt. % alumina.

9. The method of claim 8, wherein the consumable coating is applied as a slurry comprising solid particles in a liquid carrier.

10. The method of claim 9, wherein the solid particles have a median particle size of from 0.1 microns to 8 microns.

11. The method of claim 9, wherein the liquid carrier comprises an alcohol and/or a ketone.

12. The method of claim 9, wherein the slurry comprises a solids loading of from 15 wt. % to 40 wt. %.

13. The method of claim 9, wherein the liquid carrier comprises an organosilicon material.

14. The method of claim 13, wherein the organosilicon material comprises from 1 wt. % to 4 wt. % of a total content of the slurry.

15. The method of claim 13, comprising:
    converting at least a portion of the organosilicon material to an organosilicon derivative material upon operating the turbomachine.

16. The coated component of claim 1, wherein the consumable coating is directly on the barrier surface of the barrier coating.

17. The coated component of claim 3, wherein the rare earth silicate includes a rare earth element having an ionic radius equal to or smaller than that of europium.

* * * * *